United States Patent [19]

Shaw

[11] Patent Number: 5,478,786
[45] Date of Patent: Dec. 26, 1995

[54] MANUFACTURE OF SHAPED REFRACTORY OBJECTS

[76] Inventor: Richard D. Shaw, "Dunedin", High Elms Road, Downe, Orpington, Kent BR6 7JN, United Kingdom

[21] Appl. No.: 376,458

[22] Filed: Jan. 23, 1995

Related U.S. Application Data

[63] Continuation of Ser. No. 150,778, Nov. 10, 1993, abandoned, which is a continuation of Ser. No. 841,417, Feb. 26, 1992, abandoned.

[30] Foreign Application Priority Data

Feb. 27, 1991 [GB] United Kingdom .................. 9104119

[51] Int. Cl.[6] ..................... C04B 35/043; C04B 35/443; C04B 28/34
[52] U.S. Cl. ............................. 501/111; 501/120; 106/690
[58] Field of Search ..................................... 501/111, 120; 106/690, 691

[56] References Cited

U.S. PATENT DOCUMENTS

| | | |
|---|---|---|
| 3,285,758 | 11/1966 | Limes et al. . |
| 4,152,167 | 5/1979 | Horvitz et al. . |
| 4,390,370 | 6/1983 | Seeney . |
| 4,459,156 | 7/1984 | Henslee et al. ..................... 501/120 X |
| 5,135,896 | 8/1992 | Vezza ....................................... 501/120 |

FOREIGN PATENT DOCUMENTS

| | | |
|---|---|---|
| 0116147 | 8/1984 | European Pat. Off. . |
| 0178155 | 4/1985 | European Pat. Off. . |
| 0351084 | 1/1990 | European Pat. Off. . |
| 2068356 | 8/1981 | United Kingdom . |
| 2168060 | 6/1986 | United Kingdom . |

*Primary Examiner*—Karl Group
*Attorney, Agent, or Firm*—Cushman Darby & Cushman

[57] ABSTRACT

A method of manufacturing a refractory object which comprises setting basic refractory grains and a polyphosphate into a green shape characterised by the inclusion of minerals which, when the slurry is set and fired, develop spinel linkages.

5 Claims, No Drawings

MANUFACTURE OF SHAPED REFRACTORY OBJECTS

This is a continuation of application Ser. No. 08/150,778, filed on Nov. 10, 1993, which was a rule 62 FWC of 07/841,417 filed Feb. 26, 1992, all of which are now abandoned upon the filing hereof.

DESCRIPTION

This invention relates to the manufacture of shaped refractory objects. The objective is to produce shaped objects, nozzles and the like of high quality for use in and around molten steel. High quality may be defined as having very good dimensional characteristics over the whole range of temperature from room temperature to steel making temperatures and a very high resistance to thermal shock and high volume stability at all temperatures.

BACKGROUND OF THE INVENTION

The shaping of these refractory objects involves setting the refractory grains into a stable shape termed a "green" shape prior to final sintering either as a separate operation or in situ on first firing of the furnace or similar operation. There are three principal ways in which a "green" shape can be formed. The first and the one with which the invention is primarily concerned may be termed a chemical formation and here the refractory grains are mixed with a liquid binding system to form a slurry. The slurry is formed to the desired shape and the system reacts chemically to set. Typically the slurry is aqueous and the reaction is a hydrolysis followed by setting of the hydrolysate by the formation of a polymer. The second possibility is dry or isostatic pressing; here the grains are only slightly moistened and pressed into the desired shape. Thirdly cement-based systems may be set hydraulically into a green shape.

The first "chemical" systems have been typified in the prior art by the use of binding liquids based on the alkoxides of silica and alumina. Systems based upon silica are however not suitable for binding basic refractories such as magnesite as the acidic silica tends to react with the basic refractory. The steel industry is coming to dictate non-acidic refractories which are less reactive with molten metals and slags.

There is therefore an increasing demand for basic refractories and our EPA No. 0,351,084 proposes mixing basic refractory grains with a binding liquid containing a phosphate preferably in the form of an ammonium polyphosphate. The phosphate reacts with the basic grains to set the slurry into a stable green shape.

However such systems have not been entirely satisfactory and pre-firing to a high temperature has been a necessity which has been a substantial economic and technical disadvantage.

SUMMARY OF THE PRESENT INVENTION

It is an objective of the present invention to provide an improved basic refractory system which can be fired in situ.

In accordance with the present invention there is provided a method of manufacturing a refractory object which comprises setting basic refractory grains and a polyphosphate into a green shape characterization by the inclusion of minerals which, when the slurry is set and fired, develop spinel linkages.

Thus the basic refractory can consist of or include as a substantial component magnesia and alumina which can be added to the dry mix to develop an alumina/magnesia spinel on firing. Chromium is another spinel-forming mineral but is not at present favored being regarded as hazardous.

DETAILED DESCRIPTION OF PRESENT INVENTION

It has been appreciated that ammonium phosphates developed a good bond at low and medium temperatures holding the body together before the high temperature sinter bonds develop. It was found, in practice, that these sinter bonds only developed effectively at a higher temperature than that which the phosphate bonds tended to become ineffective. In accordance with the present invention spinel-linkages are developed in situ at a lower temperature, prior to that which the phosphate bonds lose their effectiveness, thus preserving the body's structural integrity until the sinter bonds are properly formed.

A typical procedure in accordance with the invention is as follows:

1. The binder used one of the P8 series binders supplied by Clinochem and is a complex polyammonium phosphate either in liquid or solid form. P8 denotes a liquid whilst P8- designates a solid the second digit being an indication of reactivity. Thus P82 is less reactive than P81.

In the refractory mixtures for each 1% of $P_2O_5$ generated from the bond there should be included at least 1% of MgO and 2% of $Al_2O_3$ in small particulate reactive form.

Polyammonium phosphates, when brought into the presence of MgO form an insoluble phosphate, Magnesium Phosphate and a strong green set is caused by the reaction. The ammonia is driven off during water or moisture removal and thus does not generate any detrimental ceramic properties as would for example sodium phosphate.

It should be noted however that an excess of $P_2O_5$ in this form on heating will in any event release the $NH_3$ and leave a very reactive phosphate residue which will readily react with other parts of the ceramic body particularly $Al_2O_3$. Aluminum phosphate is commonly used for a bond for refractory bodies but when used directly in the presence of MgO its reaction is too violent to be practical.

2. Since the reaction—solidification—of the green set casting is dependent upon the MgO, a degree of control as to the rate of setting of the system may be exercised by controlling (a) the amount of MgO in the system (b) the particle size of the MgO and (c) the degree of calcination of the magnesia which will affect the surface area of the particle or alternatively (d) the setting temperature.

Each of these parameters needs consideration for best given required result.

3. In order to make, say, a very high purity silica free alumina body then clearly the simple addition of MgO of fixed quantity and particle size and surface area will achieve a given setting time.

Similarly with fused or sintered Alumina magnesia spinel whose formation reaction is complete—i.e. no free magnesia—the same applies.

However for a magnesite body it is either necessary to dilute the MgO in the small (reactive) particle with some ceramic material—typically spinel which is mildly basic in nature, or alternatively use Clinochem dry P83 polyammonium phosphate which is sufficiently slow reacting to be used with pure magnesite or dolomite.

4. After the green shape has been made and set, further strength is generated by drying and heating as with many phosphates to 250°350° C. The pieces have now reached optimum strength and with or without further treatment in many instances can be used immediately.

5. However, the strength of the phosphates diminishes with increase in temperatures particularly over and above 1400° C. This is partly caused by a natural drop in strength of the glassy phosphate phases and in addition some evaporation of the phosphate. However, the presence of reactive alumina particles will react with free magnesia present in the body either directly or as derived from evaporation of the phosphate to form spinel. Spinel can form a very strong ceramic bond. Furthermore spinel formed in the matrix of the body in this manner occurs at modest temperatures—below the weakening temperatures of the phosphate bonds.

Thus as a loss of efficacy of one bond occurs the other takes over and in this way the need to fire at very high temperatures is avoided. Spinel formed within the matrix of the refractory body in this manner furthermore does not cause a disruptive breakdown of the refractory piece but, surprisingly, improves its resistance to thermal shock and volume stability.

A considerable benefit of this technique is the ability to combine highly refractory materials with engineered steel components, inserts, containers and the like. This is an ever increasing requirement of refractory materials in very arduous applications.

Clearly to be able to combine both metal and ceramics requires very high volume stability from hot zone to metal contact area. These procedures allow such a practice.

The following examples of recipes and properties show the nature of the invention; that is to say that all the recipes use polyammonium phosphate liquid or solid with the presence of magnesia to cause the phosphate to set and the presence of alumina in a ratio to ensure that a spinel is formed at temperatures below the expected final use temperature and before the magnesium or aluminium phosphate has weakened unduly.

The actual procedure to make a cast refractory piece is described as a generality as is a pressed refractory piece. However, in either instance those conversant in the art will clearly see the nature of the procedure. Dry blends may be made up as follows to the following Recipes:

| Recipe No. 1. Magnesite | | |
|---|---|---|
| Calcined Magnesite | −5 + 1 mesh | 20 parts by weight |
| Calcined Magnesite | −3 mesh | 40 parts by weight |
| Calcined Magnesite | −200 mesh | 3 parts by weight |
| Fused spinel | −325 mesh | 23 parts by weight |
| Calcined alumina | −325 mesh | 6 parts by weight |
| Recipe No. 2. Alumina | | |
| Tabular Alumina | −5 + 1 mesh | 27 parts by weight |
| Tabular Alumina | −3 + 1 mesh | 23 parts by weight |
| Tabular Alumina | −5 mesh | 25 parts by weight |
| Calcined Magnesite | −200 mesh | 2 parts by weight |
| Calcined Alumina | | 4 parts by weight |
| Spinel | −200 mesh | 20 parts by weight |
| Recipe No. 3. Spinel | | |
| Spinel | −5 + 3 mesh | 35 parts by weight |
| Spinel | −3 + 1 mesh | 20 parts by weight |
| Spinel | −1 mesh | 15 parts by weight |
| Spinel | −325 mesh | 23 parts by weight |
| Calcined Magnesite | −200 mesh | 3 parts by weight |
| Calcined Alumina | | 6 parts by weight |

In order to make a cast shape with the above 3 recipes then a solution of P8 polyammonium phosphate binder ex Clinochem approximately 60 ccs per Kg 20 ccs water of dilution with approximately 1 wt % of soap is mixed with the recipe. More or less water maybe added to increase or decrease fluidity. After proper mixing into a suitable mobile slurry, the mixture is vibration consolidated into a suitable mold or cavity. The above recipes are blended to give setting times of from 5–10 minutes dependent upon temperature.

Adjustment to the setting times can be made to the recipe by adjusting the amount and form of magnesia fine particles.

When the mixture has set hard the mold can be removed. The ceramic piece is then preferably dried and heated to 250°–350° C. in order to maximize the strength of the phosphate bond. This is in common with phosphate bond practice.

The pieces can then be used with no further treatment. Despite any changes that occur within the system caused by changes in nature of phosphates the typical properties obtained after heating to 1400° C. can be seen to be very acceptable as in Table 1 set out below:

TABLE 1

|  | Example 1 (based on Recipe 1) MAGNESITE 77 20 | | Example 2 (based on Recipe 2) ALUMINA 6 91 | | Example 3 (based on Recipe 3) SPINEL 30 67 | |
| --- | --- | --- | --- | --- | --- | --- |
|  | Dried at 200° C. | Heated to 1400° C. | Dried at 200° C. | Heated to 1400° C. | Dried at 200° C. | Heated to 1400° C. |
| Bulk density lbs/cu. ft. | 17.1 | 170.6 | 181.5 | 176.3 | 153.9 | 163.7 |
| Apparent porosity | 16.4 | 18.7 | 17.2 | 19.2 | 24.9 | 23.4 |
| Water absorption | 6.05 | 6.88 | 5.96 | 6.65 | 8.99 | 8.88 |
| S.G. | 3.24 | 3.34 | 3.48 | 3.56 | 3.32 | 3.43 |
| MOR RT lbs/sq inch | 2635 | 788 | 1360 | 3570 | 1560 | 2600 |
| Cold crush lbs/sq inch | 11115 | 6240 | 7400 | 12345 | 5200 | 8460 |

All these products passed thermal shock 30+ Test.

Each of the three recipes could alternatively be mixed with dry polyammonium phosphate powder—typically Clinochem P83. However, there are many ammonium phosphates available in dry powder form which in varying degrees could be used in a like manner. Typically to:

Recipe No. 1 might be added 3 wt % of P83 dry phosphate.

Recipe No. 2 might be added 2 wt % of P83 dry phosphate.

Recipe No. 3 might be added 3% of P83 dry phosphate. These mixes could be placed in bags in a dry place—as for a castable—and subsequently have water added in order to prepare into a suitable slurry.

Using Clinochem dry P83 the setting time of mixtures based on Recipes 1–3 would be 8–9 hours, i.e. ample time to deal with a large or very complex molding.

Equally it can be seen that one could use a mixture of dry and liquid polyammonium phosphate and thus have the advantage of quick or relatively quick setting of the liquid system but with the facility to add, if so required, substantial extra phosphate to the refractory body.

U.S. Pat. No. 4,152,167 teaches the addition of a sodium polyphosphate in the presence of ammonium phosphate as giving higher strengths. This at low temperatures may well be so. However in very high quality temperature resisting refractories the presence of sodium or indeed potassium can be very deleterious. Furthermore it has been found that the addition of phosphates of either of these metals results in a lower ultimate density than the addition of extra polyammonium phosphates as suggested above. Resistance to metal or slag at high temperature to a considerable degree is dependent upon density as well as the chemical resistance.

Example No. 4 is a predominately magnesitic body. By using P83 dry powder a castable or rammable body may be formed having a setting time of between 4–10 hours depending upon the setting temperature. This is a setting time considered by many skilled in the art as acceptable as an alternative to the use of cement castable. Faster setting times would be achieved by using the simpler and hence more reactive phosphates such as mono or di-ammonium phosphates—Clinochem P81 or P82. However in the presence of a high magnesitic mixture their reactions for many castable applications would be too rapid.

EXAMPLE 4

| | | |
| --- | --- | --- |
| Calcined Magnesite | −3 + 1 mesh | 55 parts by weight |
| Calcined Magnesite | −1 mesh | 20 parts by weight |
| Calcined Magnesite | −200 mesh | 20 parts by weight |
| Calcined Alumina | | 6 parts by weight |
| Polyammonium Phosphate P83 | | 3 parts by weight |

Example No. 7 described later sets out a preferred mixture having exceptional resistance to thermal shock. This mixture when thoroughly wetted with water can be cast into a mold or alternatively be pressed into a brick or shape. For the pressed piece the quantity of water addition will only be such as to dampen the mixture.

In each of the examples, the presence of phosphate, MgO and alumina in proportions to permit the ratio of 1:1:2 to be achieved has been adhered to.

Example No. 5 shows byway of example the invention as applied to a body containing graphite or carbon.

| | | |
| --- | --- | --- |
| Spinel Magnesium/Aluminium | −3 + 1 mesh | 55 parts by weight |
| Spinel Magnesium/Aluminium | −1 mesh | 15 parts by weight |
| Spinel Magnesium/Aluminium | −200 mesh | 10 parts by weight |
| Calcined Magnesite | | 3 parts by weight |
| Calcined Alumina | | 3 parts by weight |
| Reactive Alumina | | 3 parts by weight |
| Graphite | −80 mesh flake | 8 parts by weight | to which may be added 60 ccs P8 solution per Kg and 50–80 ccs of $H_2O$. Such a mixture will set in 6–10 minutes depending upon the setting temperature) and when set and dried will display many features and properties enjoyed by the group of refractories known generically as graphitized alumina.

Example No. 6 describes in more detail a preferred embodiment of the invention used to manufacture a nozzle suitable for arduous steelmaking application—particularly high manganese steels, or calcium, nascent gas, or aluminium treated steels.

The volume stability and thermal shock resistance coupled with the chemistry of product made with this recipe permits the manufacture of gas injection parts where steel support components can be incorporated into the part during manufacture, thus precluding a high temperature sintering or firing procedure.

| | | |
|---|---|---|
| Sintered spinel | −3 + 1 mesh | 55 parts by weight |
| Sintered spinel | −1 mesh | 20 parts by weight |
| Sintered spinel | −200 mesh | 20 parts by weight |
| Calcined Magnesia | | 3 parts by weight |
| Calcined Alumina | | 3 parts by weight |
| Reactive Alumina | | 3 parts by weight |

To this mixture would be added:

60 ccs per Kg of P8 Poly ammonium phosphate 3 ccs per Kg of soap solution, and from 10–20 ccs per Kg of water diluent depending upon the texture and detail required of the casting piece.

The ingredients would be thoroughly mixed in a high shear mixer for 1–3 minutes. The resulting slurry would then be cast into a mold while vibrated. The slurry consolidated by vibration and then allowed to set 6–10 minutes. After setting, the cast piece would be stripped and then dried to remove the moisture and then heated to completely form the bond of magnesium phosphate. The component would then be ready for use. During preheat and/or in use any loss of phosphate would not be deleterious because spinel forms a substitute. Of course, if the piece contained no metal parts, it could be high fired prior to use. This would however be an unnecessary expense. The invention would however still apply since the absence of any one of the three components would result in a weak, friable refractory piece or, alternatively, the need to fire or heat to much higher temperature to encourage self bonding.

Example 7 describes a recipe for much larger magnesite pieces, say typically 50–200 Kgs in weight. Again the presence of each of the components avoids the need to high fire.

This particular recipe includes the presence of spinel in a predominately magnesitic body to encourage volume stability and increase resistance to thermal shock.

| | | |
|---|---|---|
| Calcined Magnesite | −5 + 3 mesh | 4.5 parts by weight |
| Calcined Magnesite | −3 + 1 mesh | 2.5 parts by weight |
| Calcined Magnesite | −1 mesh | 1.0 parts by weight |
| Calcined Magnesite | −200 mesh | 1.5 parts by weight |
| Sintered Spinel | −1 mesh | 0.5 parts by weight |
| Sintered Spinel | −200 mesh | 0.5 parts by weight |
| Calcined Alumina | | 0.6 parts by weight |
| Dry Polyammonium Phosphate | | 0.2 parts by weight |

To this mixture would be added 4–6 wt % water containing 1–2 wt % soap and mixed to a castable consistency prior to placing in a vibrating mold. Such a mixture would set in 5–17 hours depending upon temperature.

In an alternative procedure the Dry Polyammonium phosphate may be replaced by a mixture of 0.2 parts by weight aluminium tripolyphosphate and 1 part potassium polyphosphate. This gives a much quicker setting time 15–30 minutes that is convenient for smaller pieces.

EXAMPLE 8

The previous examples have included three constituents:

Polyammonium phosphate

Fine grain magnesia

Fine grain alumina

It has been found that in some instances the alumina in granular particulate form can and should be substituted by an aluminium phosphate.

The use of aluminium ortho phosphate is not possible even though at face value (being very readily available commercially) one might perhaps consider it in solid form. However, it is acidic in nature and is not compatible with ammonium phosphates. It is also unsuitable for magnesite refractory bodies (with the exception of very low free magnesia bodies).

However, for the purposes of this example of the invention the search is not for the particular creation of green refractory piece but for an ultimately high strength, comparatively low fired piece (in situ or otherwise).

This can be achieved by the addition of tri polyphosphate which is a water insoluble fine powder.

This is mixed into the refractory grain blend example of this is as follows:

| | | |
|---|---|---|
| Spinel | −5 + 3 mesh | 35 parts by weight |
| Spinel | −3 + 1 mesh | 20 parts by weight |
| Spinel | −1 | 15 parts by weight |
| Spinel | −325 | 23 parts by weight |
| Calcined Magnesia | | 1 parts by weight |
| Aluminium tri polyphosphate | | 3 parts by weight | to which is added approximately 60 ccs per kg of P8 and 20 ccs per kg of water. After mixing the mobile slurry maybe cast.

The active ingredients of the system upon heating are magnesium phosphate and aluminium tri polyphosphate. Aluminium tri polyphosphate melts at temperatures in excess of 1000° C. and thus is in very reactive form at the temperature at which the polyammonium phosphate (unreacted residue) and the magnesium phosphates (formed by reaction to gel) may tend to break down.

The magnesium and aluminium will thus form spinel very readily. Up until this reaction takes place, the presence of aluminium phosphate creates a strong bond in the refractory as does the use of aluminium phosphates formed from the acids or aluminium ortho phosphates in magnesia free bodies.

I claim:

1. A method of manufacturing shaped high quality refractory objects suitable for use with molten steel, said method comprising the steps of mixing refractory grains with a liquid binding system to form a slurry, said binding system consisting essentially of water, polyammonium phosphate and grains of a reactive magnesium compound, said compound selected from the group consisting of calcined magnesia and calcined magnesite, which react to form a solid magnesium phosphate, incorporating reactive alumina into the slurry in an amount sufficient to ensure the formation of a spinel bond during firing, setting said slurry into a shape at a setting temperature, drying and progressively heating the set shape through temperatures ranging from 250° C. to 350° C. to form phosphate bonds, and thereafter firing the shape at a temperature over 1400° C. to form spinel bonds, the formation of the spinel bonds occurring prior to a substantial weakening of the phosphate bonds during said firing, thereby maintaining the strength of the objects during firing.

2. The method according to claim 1, wherein said slurry contains at least 1 wt % of magnesia and 2 wt % of alumina for each 1 wt % of phosphorous oxide.

3. The method according to claim 1, wherein the time necessary for said slurry to set may be controlled by varying:
 (i) the amount of magnesia;
 (ii) the particle size of the magnesia;
 (iii) the degree of calcination of the magnesia; and
 (iv) the setting temperature.

4. The method according to claim 1, wherein the firing of the refractory objects occurs in situ.

5. The method according to claim 1, wherein steel support components are incorporated into the refractory objects, said incorporation occurring before setting said slurry.

* * * * *